May 7, 1963 H. W. WEPRIN ET AL 3,088,163
STUNNING PEN
Filed Dec. 17, 1959 3 Sheets-Sheet 1

Inventors
Harry W. Weprin
Samuel Pasutin
William Chan
Ernest E. Wilson
Carl C. Batz
Attorneys

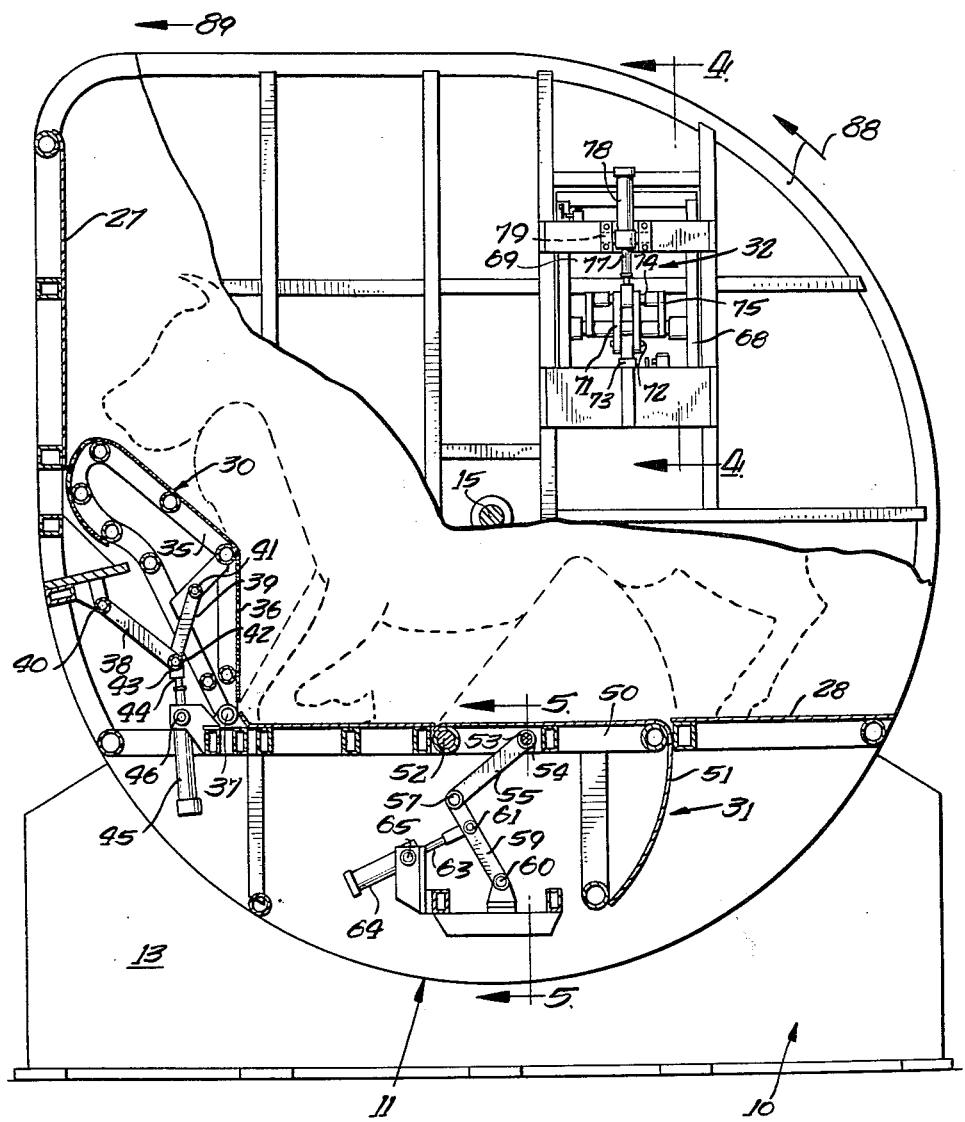

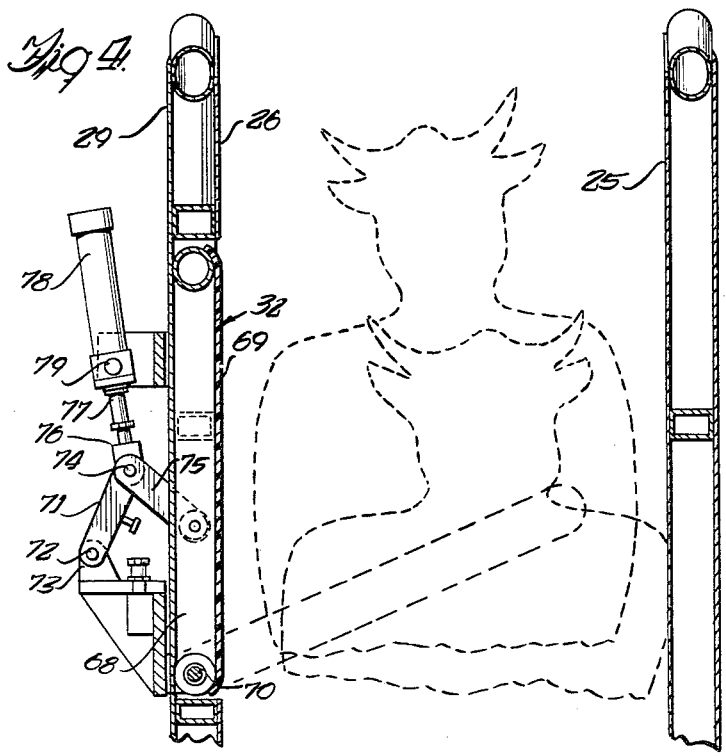

United States Patent Office 3,088,163
Patented May 7, 1963

3,088,163
STUNNING PEN
Harry W. Weprin, Chicago, Ill., and Samuel Pasutin, Royal Oak, William Chan, Highland Park, and Ernest E. Wilson, Grosse Pointe, Mich., assignors, by mesne assignments, to Armour & Company, Chicago, Ill., a corporation of Delaware
Filed Dec. 17, 1959, Ser. No. 860,264
9 Claims. (Cl. 17—1)

The present invention relates to a method employed in the stunning of animals and to a stunning pen for use in connection with the slaughtering of animals.

Traditionally the meat packing industry has been one in which a large amount of hand labor has been involved and is not an industry ideally suited to mechanization, principally for the reason that human judgement is involved in so many of the operations. However, even without eliminating the necessity for human judgment entirely, the increasing costs for each employee carried on the payroll have indicated that all possible provisions should be made to facilitate and increase the productivity of each employee. The principal object of the present invention is to provide a method and apparatus to be utilized in the slaughtering of animals, e.g. sheep, hogs, cattle, etc., which will enable one worker to have the productivity of several practicing the procedures of the prior art.

More specifically, we have devised a method, and an apparatus that incorporates that method, wherein one worker having one animal at a time delivered to him can stun the animal and attach it by one or both legs to an overhead conveyor for delivery to others who will kill and bleed the animal. One of the principal advantages of our invention is the speed with which this can be carried out. Roughly, one such worker can stun and hang about 100 to 120 steers an hour. It will be appreciated that this is nearly two steers a minute which is remarkably fast.

Another advantage of our method and apparatus is the lack of damage to the animal, and thus the carcass, when they are stunned. A steer falling to the floor when it is stunned can be seriously bruised by its weight and the distance of fall. Such bruises may result in loss in value of the flesh in the damaged area, with a corresponding loss in monetary return to the processor. In an industry where the profit often is measured in fractions of a cent it is important to obtain the maximum return possible for each animal slaughtered.

An additional object and advantage of our invention is that the apparatus is self adjusting for animals of various sizes. Obviously, it would be undesirable to be forced to sort the animals as to size and utilize separate stunning pens for various sizes of animals. Substantial flexibility is permitted with the use of the present invention because of the ability to accommodate animals substantially different in size.

A further object of our invention is the compactness, ease of operation, and low maintenance costs of apparatus employing the novel method. The floor space requirements are exceedingly nominal. For all practical purposes the working parts are enclosed which serves to bar the entry of foreign material and simplifies the cleanup operations at the end of the shift. The application of power is simple and compatible with other mechanical operations in a plant. No special techniques are needed for maintenance or repair and the regular force in a plant for that purpose can do the job.

Another object of our invention is to provide a method which will facilitate and speed special slaughtering procedures carried out by those of particular religious faiths while at the same time meeting their religious requirements.

Other objects and advantages will become apparent from the following description taken in conjunction with the drawings in which:

FIGURE 3 is an enlarged section taken at line 3—3 of FIGURE 2 with portions thereof broken away;

FIGURE 4 is an enlarged partial section taken at line 4—4 of FIGURE 3; and

Figure 1:
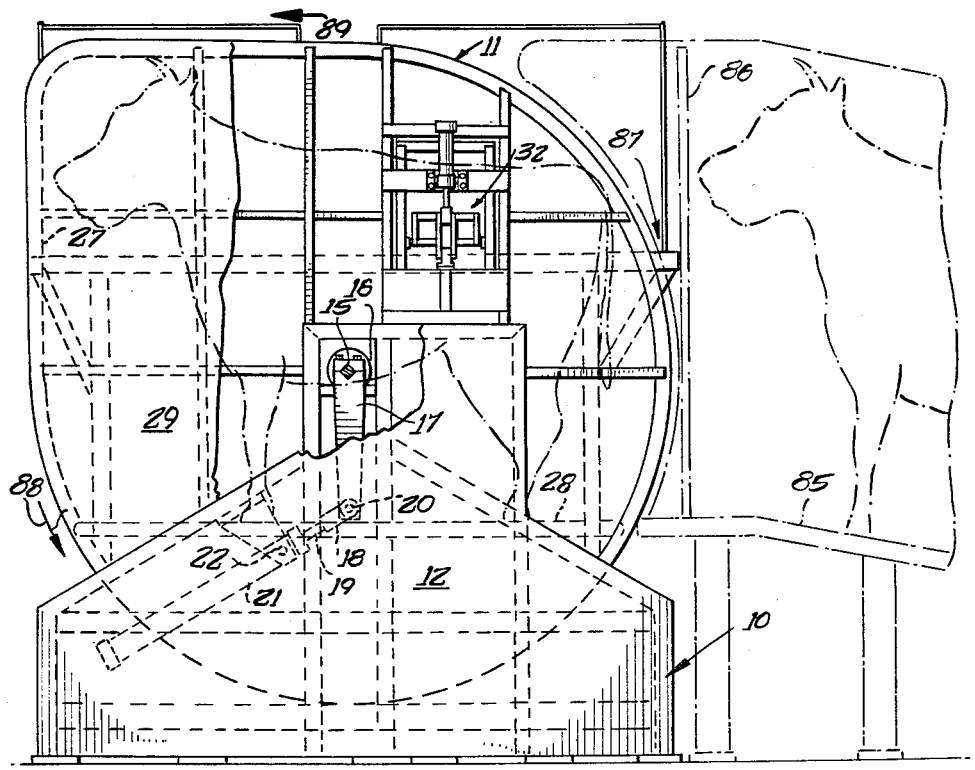
FIGURE 1 is a side elevation of an embodiment of the invention with portions of the cover plates for the frame partly broken away.

FIGURE 5 is an enlarged partial section taken at line 5—5 of FIGURE 3 elements 53 and 54 being shown partially broken away.

The method we have devised comprises first restraining the animal in a predetermined position for stunning. This restraint is accomplished by enclosing the animal at front and back and the two sides in a predetermined space. The top of this space is left open for reasons that will hereinafter be apparent and also to make the animal less apprehensive to being so enclosed. After the animal has been enclosed it is stunned in accordance with conventional practices and before the animal has an opportunity to fall to the floor it is supported in the areas of forefront and belly. The animal so supported then is tipped forward, head down, with its rear feet up. Except for the rear of the animal, the enclosure is maintained so as to position the animal.

In the preferred practices the animal is braced across its back before stunning and before tipping to further maintain the desired position of the animal when the animal is tipped forward as described. In a variation of the method the back of the animal may be supported or restrained after stunning but before it is tipped into the head down position. After tipping there are clear spaces across the back of the animal and in the area of the feet; that is, the enclosure does not prevent ingress or egress at these areas. The rear legs of the animal are grasped and the animal is then supported, usually accompanied by some lifting, by the rear legs. Normally this is done by shackling one or both of the rear legs and supporting the shackle from an overhead point. At the same time the back support or bracing of the animal across the back is removed and the shackle raised so that the animal is carried by its rear legs. The shackling may be done on one or both of the rear legs depending upon the preferences of the processor. The animal now may be moved out of the enclosure back foremost, i.e. through the clear space originally forming the top of the enclosure and now a side thereof, and transported to the desired location for slaughtering. The stunned animal now is supported by its rear legs with its head hanging down which is the desirable position for cutting and bleeding.

In a variation of our process the animal is grasped at several areas of the body, e.g. the forefront area, the belly area and the back area, and is tipped foreward into a head down, substantially vertical position without having been stunned first. Thereafter the animal is cut and bled which may be done in a manner to conform to the special religious requirements. In one practice the animal is cut and bled while it is supported in the same manner it was at the time it was tipped into the head down position. In another practice, after the animal is tipped into the head down position as just described, it is then grasped by one or both of the hind legs with the body support being released. While supporting the animal by one or both rear legs in a head down position it is then cut and bled. The cutting and bleeding procedures would be conventional.

The drawings illustrate a preferred form of apparatus for carrying out our process. It will be noted that there is a rotatable member having a floor and three sides. One of the sides forms the front and there are two adjacent sides. The framework surrounding the rotatable member forms a back to the pen when the pen is in the animal loading position but since this back enclosure does not rotate with the pen, the top of the pen is open when the pen has been rotated into the animal unloading position.

After the animal has been moved into the pen and the gate at the rear of the pen closed, forefront and belly supports are raised beneath the animal and the animal is stunned. These operations are performed by an operator standing on a walkway at one side of the pen. The enclosure of the animal and the position of the operator with respect thereto facilitate the stunning of the animal.

After stunning the animal slumps down on these supports. Before the pen is rotated a back brace is moved across the area of the back of the animal. The pen is then rotated about 90° in the direction such as to move the head of the animal downwardly with the rear legs upwardly in approximately a vertical position. In this position the operator can reach out, grasp one or both of the rear legs of the animal, and apply shackles thereto.

The shackles are connected to an overhead hoist (not shown, but of a conventional type) so that after the back support is released the hoist will raise the rear legs of the animal upwardly to support the animal in a head down position. The shackles then are connected to an overhead conveyor. The original top of the pen which now forms the foreward side of the pen is open so that the animal may be moved by the conveyor, back forwardmost, out of the pen and to the further processing stations.

An embodiment illustrated in the drawings includes a frame generally 10 on which is mounted a rotatable pen generally 11. Frame 10 includes two side pedestals 12 and 13. A pair of stub shafts 14 and 15 are secured to and extend from opposite sides of pen 11. The mounting of shafts 14 and 15 in pedestals 12 and 13, respectively, and the pen rotating structure associated therewith, is identical in each of the two pedestals. Only that employed in pedestal 12 will be described but it is understood that the structure found in pedestal 13 corresponds thereto.

Shaft 15 is journalled in a pair of bearings 16 secured to and forming a part of pedestal 12. Between bearings 16 a crank 17 is fixed to shaft 15. At the lower end of crank 17 a clevis 18 secured to the end of a piston rod 19 is pivotally affixed to crank 17 by means of a pin 20. Piston rod 19 extends from and forms a part of a fluid operated cylinder 21 which is pivotally mounted on frame 10 within pedestal 12 by means of pins 22 secured to cylinder 21 and journalled in frame 10. A corresponding fluid cylinder 21 is mounted within pedestal 13 and is similarly connected to shaft 14.

Figure 2:
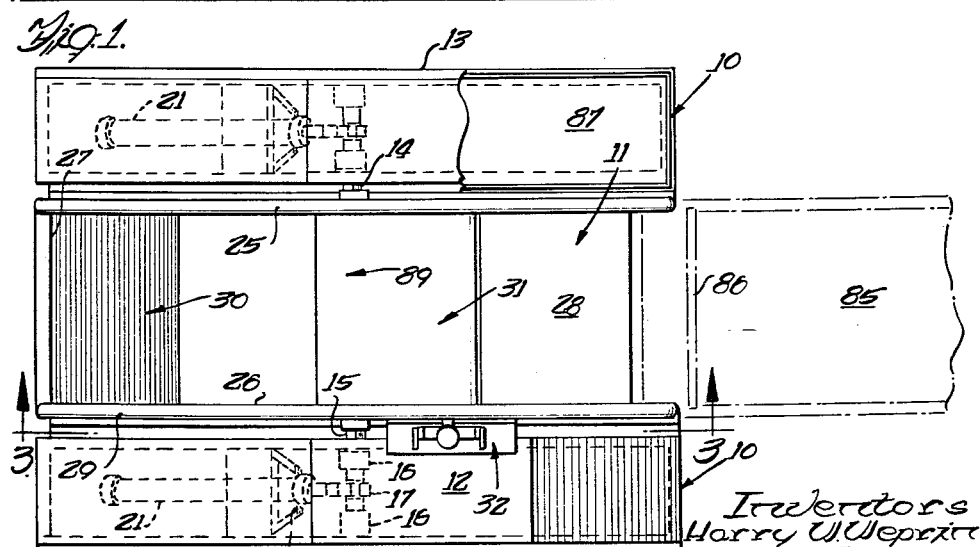
FIGURE 2 is a plan view of the embodiment of FIGURE 1 one pedestal being shown partly broken away.

Pen 11 has two side walls 25 and 26 and a front wall 27 and a floor 28. As will be seen in the drawings, the pen is formed of a plurality of intersecting structural members covered by enclosure plates such as side plate 29 in FIGURE 1. The top and rear portions of the pen as viewed in FIGURES 1–3 are open. In the front bottom corner between the intersection of front wall 27 and floor 28 is a movable forefront support generally 30. Forming a part of floor 28 is a movable belly support generally 31. A movable back support generally 32 forms a part of side wall 26.

Referring particularly to FIGURE 3, forefront support 30 comprises a frame 35 having a covering or skin 36. At its lower end, frame 35 is pivotally attached to the floor of the pen by means of a shaft 37. A toggle formed by levers 38 and 39 moves the head support 30 from the full line position illustrated in FIGURE 3 to the dotted line position illustrated therein. One end of toggle lever 38 is pivotally attached to the front of the pen by means of pin 40. Similarly, one end of lever 39 is pivotally attached to frame 35 of the forefront support by means of a pin 41. The other two ends of levers 38 and 39 are pivotally mounted on a pin 42 which also has mounted thereon a clevis 43. Clevis 43 is secured to piston rod 44 of a fluid cylinder 45. Fluid cylinder 45 is pivotally mounted from the frame of the pen by means of studs 46.

Belly support 31 includes a frame 50 with a skin or covering 51 thereon. One end of frame 50 is secured to shaft 52 journalled in the side walls of the pen 11 as best seen in FIGURE 5. Intermediate the ends of frame 50 is affixed a shaft 53 on which is journalled a sleeve 54. A pair of levers 55 are secured to sleeve 54 extending downwardly therefrom. At the lower ends, levers 55 each have a boss 56 which carry a shaft 57. A sleeve 58 is journalled on shaft 57 and again carries a pair of levers 59. At their lower end levers 59 are journalled on a shaft 60 which is fixedly mounted on a portion of a frame of the pen 11. Intermediate the ends of levers 59 is secured a shaft 61 which rotatably carries a sleeve 62. Sleeve 62 is secured to the end of piston rod 63 of a fluid cylinder 64. Cylinder 64 is pivotally mounted on the frame of pen 11 by means of studs 65.

Back support 32 is best illustrated in FIGURES 3 and 4. It comprises a frame 68 having an inner covering 69. At its lower end frame 68 is pivotally mounted on a shaft 70 secured in the frame of side 26. A pair of levers 71 are pivotally mounted on shaft 72 secured to support 73 on the outside of side 26. At the other end of levers 71 a shaft 74 pivotally connects the levers 71 with a second pair of levers 75 and with the piston rod mounting block 76. Mounting block 76 is secured to the end of piston rod 77 of a fluid cylinder 78. Cylinder 78 is pivotally attached to the frame of the pen 11 by means of stud 79.

In use, the described apparatus is loaded by leading or driving animals up a ramp 85 into pen 11. After an animal is in the pen a gate 86 is closed not only to restrain the animal from backing out of the pen but also to prevent the succeeding animal from interfering with the operation. The operator standing on platform 87 across the top of pedestal 13 is provided with the controls to operate fluid cylinders 21, 45, 64, and 78. The operator first actuates fluid cylinders 45 and 64 to move the forefront support 30 and the belly support 31 into the dotted line positions illustrated in FIGURE 3. Thereafter the animal is stunned. Upon being stunned the animal slumps down onto the forefront and belly supports as seen in dotted lines in FIGURE 3. The animal will rest with its chest or brisket area supported on forefront support 30. Its head and neck will loll across the top of that support.

At this time fluid cylinder 78 is actuated to move the toggle formed by levers 71 and 75 and lower the back support 32 down across the back of the animal as illustrated in dotted lines in FIGURE 4. The pressure of the fluid supplied to cylinder 78 is controlled by a pressure regulating valve so that only a given amount of force is exerted by support 32 against the animal. This results in support 32 adjusting its range of movement to the size of the animal in the pen. In some plants the operators will prefer to follow the method wherein the back support is lowered against the animal before it is stunned. This has the advantage of preventing the animal from rearing and making it easier to stun.

Thereafter fluid cylinders 21 are actuated to rotate cranks 17 approximately 90° in a counter-clockwise direction as indicated by arrow 88. Upon the completion of this rotation the portion of pen 11 which previously defined an open top for the pen now defines an open front side of the pen. At the same time the portion of the pen that defined the back thereof, i.e. the portion that is immediately adjacent gate 86, now defines an open top to the pen. It is a simple procedure for the operator to reach into this open top pen from his position on platform 87 to grasp the hind legs of the stunned animal and affix a shackle thereto. In the normal case, that shackle will have some power means such as a hoist (not shown) to raise the shackle and/or affix it to an overhead conveyor (not shown). The shackling equipment for animals is conventional in the industry and the details thereof form no part of our novel apparatus except insofar as it may be used in conjunction therewith.

After the animal has been shackled, fluid is applied to cylinder 78 in the reverse direction (or released) so as to return back support 32 from the dotted line position illustrated in FIGURE 4 to the full line position illustrated therein. The animal now may be raised and supported by its hind legs and moved in the direction illustrated by arrow 89 to remove it from the pen and convey it to the subsequent processing operations. As previously explained, the portion of pen 11 forwardly, in the direction indicated by arrow 89, is now open so that the animal may be removed from the pen without the necessity of hoisting it completely out of the pen. As soon as the animal is removed, forefront and belly supports 30 and 31, respectively, may be returned to their initial position. After removal of the animal, the pen may be rotated approximately 90° in a clockwise direction by the reverse action of fluid cylinders 21 so as to return the pen to the position illustrated in FIGURES 1 and 3. Immediately upon its return the pen is ready to receive another animal which may be done by opening gate 86 and urging the next successive animal into the pen.

The described embodiment may be used for slaughtering to conform to those religious practices which require that the animal be cut and bled without the preceding stunning step. In such a case the animal is driven into the pen 11 and the gate 86 is closed. The forefront support 30, the belly support 31 and the back support 32 are all activated to firmly grasp the animal on opposite sides thereof. Pen 11 is now rotated, as previously described, to position the animal in a substantially vertical position, head down. At this time the animal may be cut and bled or it may be shackled, moved out of the pen and thereafter cut and bled.

In the preferred embodiment the skin 36 of head support 30, skin 51 of belly support 31, and skin 69 of back support 32 are all of a material that will cushion the contact between these supports and the animal. This may be achieved by utilizing a resilient material for the skin or a double walled skin with an air space between the walls to form a pneumatic cushion.

The foregoing description of a specific embodiment of a structure embodying our method and apparatus is for the purpose of complying with 35 U.S.C. 112 and should not be construed as imposing unnecessary limitations upon the appended claims, inasmuch as modifications therein will be readily apparent to one skilled in the art and such modifications are deemed to be within the scope of the invention to the extent that they are not excluded by the claims. For example, a second back support, corresponding to support 32, may be employed at another point along the walls of the pen to facilitate the grasping of various sizes of animals before the pen is rotated.

We claim:

1. A device for use in the stunning of animals comprising: a frame; a pen holder mounted on said frame for rotation about an axis, a pen on said holder, said pen being of a length slightly in excess of the length of an animal and of a width to receive an animal, said pen being mounted on said holder, said pen having a floor to support an animal therein and an open top; and power means connected to said holder to position said floor horizontally whereby an animal can walk into said pen on said floor and to thereafter rotate said pen about said axis to reposition said animal for removal from said pen through said open top which becomes a side of said pen upon the rotation of said pen.

2. A device for use in the stunning of animals comprising: a frame; a pen holder mounted on said frame for rotation about an axis; a pen on said holder, said pen being of a length slightly in excess of the length of an animal and of a width to receive an animal, said pen being mounted on said holder, said pen having a floor to support an animal therein; means associated with said pen to support said animal in said pen with the body of the animal above the floor of the pen after the animal is stunned; and power means connected to said holder to position said floor horizontally whereby an animal can walk into said pen on said floor and to thereafter rotate said pen about said axis to reposition said animal after stunning with the hind legs upwardly for shackling for removal from said pen through said open top which became a side of said pen upon the rotation of said pen.

3. A device for use in the stunning of animals comprising: a frame; a pen holder mounted on said frame for rotation about an axis; a pen on said holder, said pen being of a length only slightly in excess of the length of an animal and of a width to receive an animal, said pen being mounted on said holder, said pen having a floor to support an animal therein and an open top; means associated with said pen to support said animal in said pen with the body of the animal above the floor of the pen after the animal is stunned, and power means connected to said holder to position said floor horizontally whereby an animal can walk into said pen on said floor and to thereafter rotate said pen about said axis to reposition said animal after stunning with the hind legs upwardly.

4. A device for use in the stunning of animals comprising: a frame; a pen holder mounted on said frame for rotation about an axis; a pen on said holder, said pen being of a length only slightly in excess of the length of an animal and of a width to receive an animal, said pen being mounted on said holder, said pen having a floor to support an animal therein and an open top; power means connected to said holder to position said floor horizontally whereby an animal can walk into said pen on said floor and to thereafter rotate said pen about said axis to reposition said animal for removal through said open top which became a side of said pen upon the rotation of said pen; and a walkway on said frame at a side of said pen on which a worker may stand to stun said animal and shackle said animal for removal from said pen after stunning.

5. A device for use in the stunning of animals comprising: a frame; a pen holder mounted on said frame for rotation about an axis; a pen on said holder, said pen being of a length only slightly in excess of the length of an animal and of a width to receive an animal, said pen being mounted on said holder, said pen having a floor to support an animal therein, said floor including retractable forefront and belly supports for said animal after stunning; and power means connected to said holder to position said floor horizontally whereby an animal can walk into said pen on said floor and to thereafter rotate said pen about said axis to reposition said animal in a head down position.

6. A device for use in the stunning of animals comprising: a frame; a pen holder mounted on said frame for rotation about an axis; a pen on said holder, said pen being of a length only slightly in excess of the length of an animal and of a width to receive an animal, said pen being mounted on said holder, said pen having a floor to support an animal therein and an open top; means associated with said pen to support said animal in said pen after the animal is stunned, said means including a back support movable to a position across the back of a stunned animal in the pen to hold the animal in the pen when the pen is rotated and retractable to permit removal of the animal after the legs are shackled; and power means connected to said holder to position said floor horizontally whereby an animal can walk into said pen on said floor and to thereafter rotate said pen about said axis to reposition said animal after stunning with the hind legs upwardly for shackling for removal from said pen through said open top which became a side of said pen upon the rotation of said pen.

7. A device for use in the stunning of animals comprising: a frame; a pen holder mounted on said frame for rotation about an axis; a pen on said holder, said pen being of a length slightly in excess of the length of an animal and of a width to receive an animal, said pen being mounted on said holder, said pen having a floor to support an animal therein; means associated with said pen to support said animal in said pen after the animal is stunned, said means including a back support movable to a position across the back of a stunned animal in the pen to hold the animal in the pen when the pen is rotated and retractable to permit removal of the animal after the legs are shackled, a forefront support for the stunned animal, and a retractable belly support for the stunned animal; and power means connected to said holder to position said floor horizontally whereby an animal can walk into said pen on said floor and to thereafter rotate said pen about said axis to reposition said animal after stunning with the hind legs upwardly for shackling for removal from said pen through said open top which became a side of said pen upon the rotation of said pen.

8. A device for use in the stunning of animals comprising: a frame; a pen holder mounted on said frame for rotation about an axis; a pen on said holder, said pen being of a length slightly in excess of the length of an animal and of a width to receive an animal, said pen being mounted on said holder, said pen having a floor to support an animal therein and an open top; means associated with said pen to support said animal in said pen after the animal is stunned, said means including a back support movable to a position across the back of a stunned animal in the pen to hold the animal in the pen when the pen is rotated and retractable to permit removal of the animal after the legs are shackled, a retractable forefront support for the stunned animal, and a retractable belly support for the stunned animal; power means connected to said holder to position said floor horizontally whereby an animal can walk into said pen on said floor and to thereafter rotate said pen about said axis to reposition said animal after stunning with the hind legs upwardly for shackling for removal from said pen; and a walkway on said frame at a side of said pen on which a worker may stand to stun said animal and shackle said animal for removal from said pen after stunning.

9. A device for use in the stunning of animals comprising: a frame; a pen holder mounted on said frame for rotation about an axis; a pen on said holder, said pen being of a length slightly in excess of the length of an animal and of a width to receive an animal, said pen being mounted on said holder, said pen having a floor to support an animal therein; means associated with said pen to support said animal in said pen after the animal is stunned, said means including a back support movable to a position across the back of a stunned animal in the pen to hold the animal in the pen when the pen is rotated and retractable to permit removal of the animal after the legs are shackled, a retractable forefront support for the stunned animal, and a retractable belly support for the stunned animal, said supports having a resilient covering on the portions thereof which contact the animal to cushion the contact with the animal, the means for moving said back support having means to regulate the pressure that said back support exerts against the animal whereby the back support will adjust to various sizes of animals; and power means connected to said holder to position said floor horizontally whereby an animal can walk into said pen on said floor and to thereafter rotate said pen about said axis to reposition said animal after stunning with the hind legs upwardly for shackling for removal from said pen through said open top which became a side of said pen upon the rotation of said pen.

References Cited in the file of this patent

UNITED STATES PATENTS

| 651,499 | Byrd | June 12, 1900 |
| 1,487,935 | Gray | Mar. 25, 1924 |
| 1,701,902 | Weinberg | Feb. 12, 1929 |
| 2,526,037 | Murphy | Oct. 17, 1950 |
| 2,537,387 | Wnetrzak | Jan. 9, 1951 |
| 2,640,225 | Force et al. | June 2, 1953 |

FOREIGN PATENTS

| 437,417 | Great Britain | Oct. 29, 1935 |